US012790277B2

(12) United States Patent
Michaud et al.

(10) Patent No.: US 12,790,277 B2
(45) Date of Patent: Nov. 10, 2026

(54) METHOD FOR PREPARING AND DEPOSITING A COMPOSITION

(71) Applicants: CENTRE NATIONAL DE LA RECHERCHE SCIENTIFIQUE, Paris (FR); UNIVERSITE DE LIMOGES, Villerbanne (FR)

(72) Inventors: Gabriel Michaud, Limoges (FR); Manuella Cerbelaud, Limoges (FR); Frédéric Dumas-Bouchiat, Feytiat (FR); Fabrice Rossignol, Limoges (FR); Arnaud Videcoq, Limoges (FR)

(73) Assignees: CENTRE NATIONAL DE LA RECHERCHE SCIENTIFIQUE, Paris (FR); UNIVERSITE DE LIMOGES, Villerbanne (FR)

( * ) Notice: Subject to any disclaimer, the term of this patent is extended or adjusted under 35 U.S.C. 154(b) by 86 days.

(21) Appl. No.: 18/854,854

(22) PCT Filed: Apr. 4, 2023

(86) PCT No.: PCT/EP2023/058770

§ 371 (c)(1),
(2) Date: Oct. 7, 2024

(87) PCT Pub. No.: WO2023/194348

PCT Pub. Date: Oct. 12, 2023

(65) Prior Publication Data

US 2025/0353792 A1 Nov. 20, 2025

(30) Foreign Application Priority Data

Apr. 8, 2022 (FR) ....................................... 2203236

(51) Int. Cl.
*C04B 35/14* (2006.01)
*B28B 1/00* (2006.01)
(Continued)

(52) U.S. Cl.
CPC .............. *C04B 35/14* (2013.01); *B28B 1/001* (2013.01); *B33Y 10/00* (2014.12); *B33Y 40/10* (2020.01);
(Continued)

(58) Field of Classification Search
CPC ....... B28B 1/001; C04B 35/10; C04B 35/117; C04B 35/14; C04B 35/18; C04B 35/624;
(Continued)

(56) References Cited

U.S. PATENT DOCUMENTS

2003/0065400 A1 4/2003 Beam et al.
2021/0268729 A1 9/2021 Hensen et al.

FOREIGN PATENT DOCUMENTS

WO 2019180093 A1 9/2019

OTHER PUBLICATIONS

Garcia-Perez et al., J Colloid and Interface Science, vol. 313, 2, 2007, 527-536 (Year: 2007).*

(Continued)

*Primary Examiner* — Yunju Kim
(74) *Attorney, Agent, or Firm* — HAUPTMAN HAM, LLP

(57) ABSTRACT

A method for assembling of suspensions inside a channel, such as to form aggregates or agglomerates of particles and to expel a composition including the aggregates or agglomerates from the channel in order to produce a part by additive manufacturing. The method is preferably performed on colloidal suspensions.

9 Claims, 1 Drawing Sheet

(51) Int. Cl.

| | |
|---|---|
| ***B33Y 10/00*** | (2015.01) |
| ***B33Y 40/10*** | (2020.01) |
| ***B33Y 70/10*** | (2020.01) |
| ***C04B 35/10*** | (2006.01) |
| ***C04B 35/624*** | (2006.01) |

(52) U.S. Cl.
CPC .............. *B33Y 70/10* (2020.01); *C04B 35/10* (2013.01); *C04B 35/624* (2013.01); *C04B 2235/3217* (2013.01); *C04B 2235/3418* (2013.01); *C04B 2235/6026* (2013.01)

(58) Field of Classification Search
CPC ............ C04B 35/6263; C04B 35/6265; C04B 35/62807; C04B 35/62813; C04B 2235/3217; C04B 2235/3418; C04B 2235/5445; C04B 2235/6026; C04B 2235/665; B33Y 10/00; B33Y 30/00; B33Y 40/10; B33Y 70/10; B29C 64/141; B29C 64/165
See application file for complete search history.

(56) References Cited

OTHER PUBLICATIONS

Michaud, Gabriel, "Structuring colloidal suspensions in a microfluidic device; an experimental and numerical study," Jun. 14, 2022.
Aimable et al., A., "An experimental and simulation study of heteroaggregation in a binary mixture of alumina and silica colloids," Colloids and Surfaces A: Physiochemical and Engineerings Aspects, vol. 605, Jul. 28, 2020.
International Search Report and Written Opinion issued in corresponding International Application No. PCT/EP2023/058770, dated Jun. 23, 2023, pp. 1-9.

* cited by examiner

METHOD FOR PREPARING AND DEPOSITING A COMPOSITION

The present application is a U.S. National Phase of International Application Number PCT/EP2023/058770, filed Apr. 4, 2023, which claims priority to French Application No. 2203236, filed Apr. 8, 2022.

TECHNICAL FIELD

The invention relates to the field of preparation and deposition of a composition, in particular in order to make a part by additive manufacturing.

The invention is of particular interest for the manufacture of a part made of ceramic.

PRIOR ART

Conventional additive manufacturing processes by direct writing of parts made of ceramic implement a step of depositing a viscoelastic composition in layers using a printhead.

This viscoelastic composition typically comprises additives such as plasticisers and/or organic binders conferring on the composition the rheological properties required to enable flow thereof in the printhead while at the same time avoiding spreading thereof during deposition.

Among other drawbacks, the use of plasticisers and organic binders requires carrying out a debinding step. Debinding has a cost in terms of time and energy and might damage the part, all the more so as the wall thicknesses are large.

In addition, the presence of organic elements in the composition does not promote intimate bonds between the grains of the ceramic powder, neither between the layers successively deposited by the printhead, nor between the first deposited layer and the support, which might affect the mechanical strength of the part.

In particular, the invention aims to overcome the drawbacks of conventional additive manufacturing processes by direct writing as well as the drawbacks associated with the compositions used in these processes.

DISCLOSURE OF THE INVENTION

An object of the invention is a method for preparing and depositing a composition, comprising:

- a step of introducing two suspensions each comprising particles into a channel,
- a step of assembling the suspensions within the channel so as to form said composition and so that this composition includes aggregates or agglomerates of said particles,
- a step of expelling the composition from the channel.

This method can typically be implemented to make a part by additive manufacturing. In other words, the expulsion step may be carried out so as to manufacture a part by depositing one or more layer(s) of said composition.

Unlike conventional additive manufacturing processes by direct writing wherein the composition is assembled before introduction thereof into a printhead, the method of the invention implements a step of assembling the suspensions directly in the channel at the outlet of which it is deposited. In other words, the assembly step is in this case carried out directly within a printhead, just before depositing the composition formed by this assembly.

The formation of aggregates or agglomerates of particles in the channel allows initiating structuring of the composition in the channel before deposition thereof and obtaining a cohesive material with mechanical consolidation at the outlet of the channel.

Such an assembly of suspensions in the channel allows introducing into the channel fluid suspensions, or more generally suspensions of low viscosity, by comparison with a conventional shear-thinning and pseudo-plastic ink.

Consequently, the suspensions may be free of any organic plasticiser or binder type additive, or include a reduced amount of organic elements.

This results in many advantages, both economic and environmental and in terms of quality of the part thus manufactured.

In particular, the absence or the presence of organic additives in a reduced amount allows avoiding rest to a debinding step, which allows preserving the integrity of the part and reducing the economic and environmental impact associated with manufacture thereof.

As regards the quality of the part, the absence or the presence in a reduced amount of organic elements tends to promote the intimate bonds of the different portions of the composition forming the part as well as holding thereof on the support during the deposition. This results in an improvement in the mechanical strength of the part and/or a better hooking of the part on the support, for example making the method compatible with a sealing or repair application.

Moreover, the fluidity of the suspensions reduces the elastic energy stored during the implementation of the method, which allows improving control of the retardants and of the accelerations of the deposition member integrating the channel.

Moreover, assembly in the channel allows, for example by tuning its geometry and/or its outlet, making specific particle arrangements, in particular in terms of spatial distribution, internal structuring of the composition, or concentration gradients.

In particular, the assembly step may be implemented so as to produce a selective localised aggregation/agglomeration between the particles so as to generate a diffuse interface between the two assembled suspensions.

Thus, the invention allows improving the mechanical strength of the part, for example during a subsequent high-temperature sintering or post-consolidation step and/or to generate specific composition gradients.

In one embodiment, the particles comprise a first type of particles and a second type of particles selected so as to be able to develop bonds therebetween during the assembly step, in order to form said aggregates or agglomerates.

Preferably, said connections are electrostatic.

Such combinations of particles allow obtaining rapid aggregation/agglomeration reactions.

This allows increasing the deposition rate.

Alternatively, other types of particles may be implemented, by developing electrostatic bonds or bonds of a different kind.

In one embodiment, during the introduction step, one of the suspensions comprises the particles of the first type and the other one of said suspensions comprises the particles of the second type.

In one embodiment, the particles of the first type and the particles of the second type have surface electrical charges of opposite signs.

For example, the particles of the first type may have positive surface electrical charges and the particles of the second type negative surface electrical charges, or vice versa.

Preferably, the particles of the first type and the particles of the second type have a zeta potential of opposite signs.

The control of the zeta potential of the different particles may be achieved by any conventional method, for example by functionalising particles, by modifying the pH of the suspension, etc.

In a preferred embodiment, said suspensions are colloidal suspensions.

Preferably, the particles are selected so that the composition expelled from the channel forms an element made of ceramic.

For example, the particles of the first type may comprise silica particles. The particles of the second type may comprise silica particles functionalised by amine functions or deflocculated alumina particles.

In one embodiment, the introduction step comprises a spatially and/or temporally separate introduction of the suspensions.

Thus, each of the suspensions could be introduced through a respective inlet of the channel, simultaneously or one after another.

To this end, the channel may comprise two distinct inlets, located for example at one end of the channel opposite to the outlet or configured so that the suspensions are introduced into the channel coaxially with respect to one another.

In one embodiment, the method comprises a step of post-heat treatment of the composition expelled from the channel.

This post-heat treatment may comprise a step of selective laser consolidation/drying/sintering.

The method may be implemented to manufacture many types of parts in numerous fields such as healthcare or information and communication technologies.

For example, the method may be implemented so that the part forms a portion of an implant or of a microelectronic component such as a capacitor.

In particular, the absence or the presence in a small amount of organic elements is interesting in biomedical applications.

The method of the invention is not limited to making of a part by additive manufacturing. Without limitation, this method may also be implemented to glue, assemble and/or repair an object using the composition coming out of the channel, or to encapsulate a component using this composition in order to make a composite part.

Another object of the invention is a device for preparing and depositing a composition, comprising a channel configured to implement a method as defined hereinabove.

In the context of an application in additive manufacturing, this device may for example comprise a printhead integrating said channel.

In one embodiment, the channel is a microchannel, i.e. a channel having at least one dimension, for example a diameter, smaller than one millimetre.

In one embodiment, the channel comprises an outlet configured to expel the composition, the outlet having a section having a dimension smaller than 1.5 mm, preferably smaller than 1 mm, for example 800 μm.

In one embodiment, the channel comprises a first inlet able to introduce one of said suspensions into the channel and a second inlet able to introduce the other one of said suspensions into the channel.

Other advantages and features of the invention will become apparent upon reading the following non-limiting detailed description.

BRIEF DESCRIPTION OF THE DRAWINGS

The following detailed description refers to the appended drawings wherein.

DETAILED DESCRIPTION OF EMBODIMENTS

Figure 1:
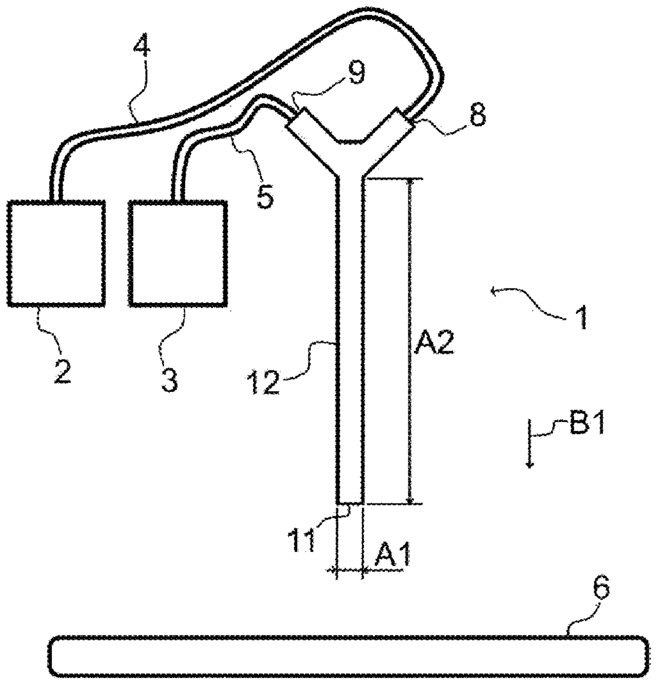
FIG. 1 is a schematic view of a device in accordance with a first embodiment of the invention.

A device in accordance with a first embodiment of the invention is schematically shown in [FIG. 1].

The device of [FIG. 1] comprises a member forming a channel 1, tanks 2 and 3, pipes 4 and 5 and a support 6.

In this example, the device is implemented to make a part by additive manufacturing, the member forming the channel 1 belonging to a printhead of an additive manufacturing tool (not shown).

In this example, the tank 3 contains a first colloidal suspension comprising a first type of particles with a negative surface electrical charge, whereas the tank 2 contains a second colloidal suspension comprising a second type of particles with a positive surface electrical charge.

The channel 1 comprises two inlets 8 and 9, an outlet 11 and a portion 12 extending between the inlets 8 and 9 on the one hand and the outlet 11 on the other hand.

In this example, the portion 12 of the channel 1 has a cylindrical shape with a diameter A1 equal to about 800 μm and a length A2 equal to about 9 cm.

The tank 2 is fluidly connected to the inlet 8 of the channel 1 via the conduit 4 so as to be able to introduce into the channel 1, and in particular into the portion 12 of the channel 1, the suspension contained in the tank 2.

Similarly, the tank 3 is fluidly connected to the inlet 9 of the channel 1 via the pipe 5 so as to be able to introduce into the channel 1, and in particular into the portion 12 of the channel 1, the suspension contained in the tank 3.

The device comprises movement means (not shown), such as pressure differential pumps or syringe drivers, configured to introduce the first suspension and the second suspension into the channel 1, respectively via the inlets 8 and 9, so that these suspensions penetrate the portion 12 of the channel 1 by flowing towards the outlet 11 according to a flow direction B1.

The particles of the two suspensions having surface electrical charges of opposite signs, these develop therebetween, within the portion 12 of the channel 1, electrostatic bonds forming aggregates/agglomerates of particles.

Thus, an assembly of the suspensions is made within the portion 12 so as to form, upstream of the outlet 11 with respect to the flow direction B1, a composition which includes these aggregates/agglomerates of particles.

The movement of the suspensions along the channel 1 in the flow direction B1 results in a progressive expulsion of the composition through the outlet 1.

The support 6 is arranged opposite the outlet 11 of the channel 1 so that the composition that is expelled therefrom is deposited over this support 6.

In this example, the flow direction B1 defines a trajectory comprising a component directed vertically from top to bottom, the support 6 being arranged below the outlet 11 of the channel 1. Thus, the composition coming out of the channel 1 through its outlet 11 flows in the direction of the support 6 under the action of the flow.

In a manner known per se, the device is configured to perform a relative movement of the printhead relative to the support 6 so as to arrange the composition over the support 6 according to a previously selected arrangement.

In particular, such a relative movement allows forming, with the composition, a succession of layers so as to form a three-dimensional part.

Figure 2:
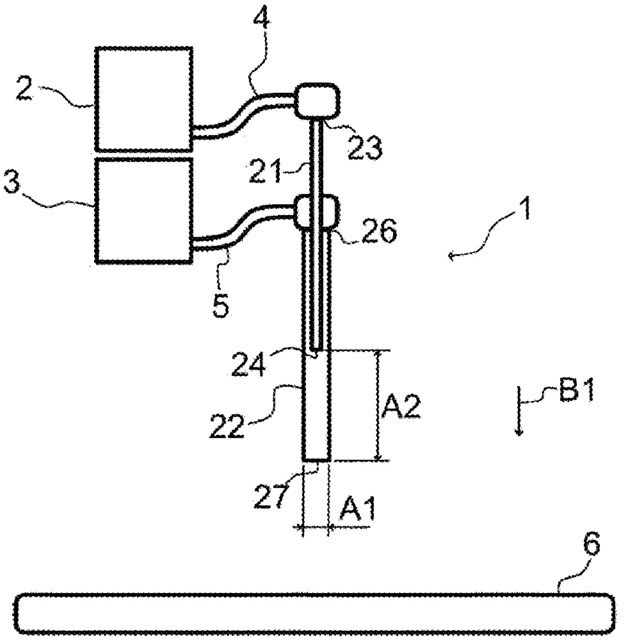
FIG. 2 is a schematic view of a device in accordance with a second embodiment of the invention.

FIG. 2 schematically illustrates a second embodiment of a device in accordance with the invention, which differs from that one of FIG. 1 in that it is configured to assemble the two suspensions coaxially.

The device of FIG. 2 is described only according to its differences with regards to that one of FIG. 1. The previous description applies by analogy to the embodiment of FIG. 2.

The device of FIG. 2 differs from that one of FIG. 1 essentially in that it comprises a double channel 1, in this case a first channel 21 and a second channel 22 nested inside one another.

The channel 21 has a generally parallelepiped geometry, one end of which forms an inlet 23 and an opposite end forms an outlet 24 of this channel 21.

The channel 22 has a generally cylindrical geometry, one end of which forms an inlet 26 and an opposite end forms an outlet 27 of this channel 22.

A lower portion of the channel 21 extends inside an upper portion of the channel 22 coaxially so that the outlet 24 of the channel 21 opens into the channel 22.

The channel 22 comprises a lower portion extending longitudinally between the outlet 24 of the channel 21 and the outlet 27 of the channel 22.

In this example, the lower portion of the channel 22 has a cylindrical shape with a diameter A1 equal to about 800 μm and a length A2 equal to about 9 cm.

The tank 2 is fluidly connected to the inlet 23 of the channel 21 via the conduit 4 so as to be able to introduce into the channel 21 the first suspension contained in the tank 2.

Similarly, the tank 3 is fluidly connected to the inlet 26 of the channel 22 through the pipe 5 so as to be able to introduce into the channel 22 the second suspension contained in the tank 3.

Thus, the first suspension can flow in the channel 21 towards its outlet 24 so as to penetrate into the lower portion of the channel 22, radially at the centre of this channel 22.

In turn, the second suspension can flow in the channel 22 in the direction of its outlet 27, at first radially around the channel 21 and then in the lower portion of the channel 22 by penetrating into this lower portion in the form of a ring whose geometry is defined radially inside by the section of the channel 21 and radially outside by the geometry of the channel 22.

Thus, the two suspensions tend to be assembled so as to have a core-shell type structure, the core mainly comprising the first suspension, the shell mainly comprising the second suspension.

First Example

A first example of implementation of the method of the invention will now be described with regards to the device of FIG. 2.

In this first example, the first suspension contained in the tank 3 is an aqueous suspension of silica particles and the second suspension contained in the tank 2 is an aqueous suspension of silica particles modified at the surface by amines.

In a manner known per se, the silica particles are synthesised according to the method described in the following document: M. A. Piechowiak, A. Videcoq, F. Rossignol, C. Pagnoux, C. Carrion, M. Cerbelaud and R. Ferrando, Oppositely Charged Model Ceramic Colloids: Numerical Predictions and Experimental Observations by Confocal Laser Scanning Microscopy, Langmuir 2010, 26(15), 12540-12547. The synthesis of these particles is based on a process known as the "Stb̈er® process" allowing obtaining silica core-shell particles with a fluorescent agent incorporated at the centre.

The silica particles thus obtained are spherical and have an average diameter of about 600 nm.

To prepare the first suspension, a powder consisting of silica particles thus obtained is introduced into a volume of deionised water so as to obtain the desired volume fraction of powder. In this example, the volume fraction is 38 v %.

Deagglomeration is carried out conventionally by ultrasound, using a sonotrode, by imposing the following cycle: 300 W for 30 s with 3 s of pulsation and 1 s of rest.

The silica particles of the first suspension thus prepared have a negative surface potential over a wide pH range.

To ensure the stability of the suspension, the pH of the silica is adjusted between 7 and 8 so as to have a zeta potential around −40 mV.

For the second suspension, silica particles obtained according to the above-described method are modified at the surface by amines. The surface modification of the silica is done by grafting an organosilane, in this example 3-aminopropyltriethoxysilane (APTES). To do so, a powder consisting of synthesised silica particles is immersed in deionised water and then magnetically stirred. Afterwards, the APTES is added and stirring is maintained for 24 hours at room temperature. The grafted silica particles are rinsed with water and then centrifuged four times at 3,500 rpm for 5 min before being dried at 50° C. overnight.

The silica particles thus modified immersed in water have a positive surface potential below pH 7.5 and negative above.

The second suspension is prepared in the same manner as the first suspension, with the difference that the pH is adjusted between 4.5 and 5 to have a zeta potential around +40 mV.

The zeta potential may be measured by zetametry or acoustic photometry.

In the case where the two suspensions are introduced into the channel 1 in equivalent proportions, the pH of the mixture is in the range of 6, knowing that, over the pH range from 2 to 7.5, the silica particles and the modified silica particles have opposite surface potentials and are therefore likely to hetero-aggregate.

In this example, the two suspensions are individually stable and, when they are mixed in the lower portion of the channel 22, the resulting suspension is significantly aggregated.

Second Example

A second example of implementation of the method of the invention will now be described with regards to the device of FIG. 2.

In this second example, the first suspension contained in the tank 3 is an aqueous suspension of silica particles commercialised by "Alfa Aesar by Thermo Fisher Scientific", under the designation "L16985", in the form of an amorphous powder of spherical particles with an average diameter of 500 nm. The second suspension contained in the tank 2 is an aqueous suspension of alumina particles of the "Alumina ceramic (Series AKP −30)" type commercialised by the company "Sumimoto Chemical advanced technologies" and having an average size in the range of 400 nm.

Measurements of zeta potentials carried out on this commercial silica show a behaviour similar to that obtained for the particles synthesised by the Stöber route (cf. hereinabove). The zeta potential is negative over the considered pH range.

The alumina particles in an aqueous suspension have a positive zeta potential below pH 9 and negative above the latter.

Between pH 2 and 9, the alumina and silica particles used in this second example have surface potentials of opposite signs.

The suspensions are prepared in the same manner as in the first example described hereinabove.

In this second example, each of the suspensions has a volume fraction of powder equal to 30 v % and are prepared using osmosed water.

To ensure the stability of the alumina suspension, the pH is adjusted around 5-6 by adding hydrochloric acid such that its zeta potential is around 45 mV.

It has been observed that these silica and alumina suspensions are stable and that their mixture results in a rapid aggregation/agglomeration.

The description of the first example applies by analogy to this second example.

Third Example

A third example of implementation of the method of the invention will now be described with regards to the device of FIG. 2.

In this third example, the first suspension contained in the tank 3 is an aqueous suspension of alumina particles modified at the surface by a dispersant known a "DARVAN (registered trademark) C" and supplied by "Vanderbilt Minerals, LLC". This dispersant causes a modification of the surface charge of the alumina which progressively becomes negative without modifying the pH.

The second suspension contained in the tank 2 is an aqueous suspension of silica particles modified at the surface by amines, in the same manner as in the first example.

The suspensions are prepared in the same manner as in the first example in an aqueous medium with, in this third example, a powder volume concentration of 35%.

The description of the first and second examples applies by analogy to this third example.

In these examples, the flow rate of introduction into the channel 1 of each of the suspensions is 2 mL/h and the printing speed is 2.2 mm/s.

Fourth Example

A fourth example of implementation of the method of the invention will now be described with regards to the device of [FIG. 2] For this fourth example, the dimension A1 is 300 μm.

In this fourth example, the first suspension contained in the tank 3 is an aqueous suspension of alumina particles where the pH is adjusted around 5-6 by addition of hydrochloric acid such that its zeta potential is around 45 mV. This suspension is then stable. The second suspension contained in the tank 2 is an aqueous suspension of silica particles commercialised by "Alfa Aesar by Thermo Fisher Scientific", under the designation "Silicon (IV) oxide, 50% in $H_2O$ colloidal dispersion". This suspension contains spherical silica particles with an average diameter of 20 nm. The alumina suspension is prepared in the same manner as in the first example in an aqueous medium with, in this fourth example, a powder volume concentration of 30%. The silica suspension is used without modification.

In this example, the flow rate of introduction of the alumina suspension into the channel 1 is 7 mL/h and the flow rate of introduction of the silica suspension into the channel 1 is 2 mL/h. The printing speed is 6.6 mm/s.

The four examples that have just been described allow manufacturing a ceramic part without using an organic additive and without it being necessary to implement a debinding step.

Fifth Example

A fifth example of implementation of the method of the invention will now be described with regards to the device of FIG. 2.

In this fifth example, the first suspension contained in the tank 2 is an aqueous suspension of alumina particles where the pH is adjusted around 5-6 by addition of hydrochloric acid such that its zeta potential is around 45 mV such that the suspension is stable.

The second suspension contained in the tank 3 is an aqueous suspension of alumina particles modified at the surface by the adsorption of poly(sodium 4-styrenesulfonate) supplied by "Sigma-Aldrich" (a solution of 30 wt. %, Mw=70,000). The surface modification consists in setting the alumina particles in suspension in an aqueous solution of polyelectrolyte in the presence of NaCl. Afterwards, the powders are centrifuged and rinsed 3 times with osmosed water at 4,500 rpm for 5 min before being dried at 50° C. overnight. The presence of this polyelectrolyte at the surface allows obtaining negative charges at the surface of the alumina particles such that these particles have a zeta potential around −35/−40 mV in an aqueous suspension.

The suspensions are prepared in the same manner as in the first example in an aqueous medium with, in this fifth example, volume concentrations of powder of 26% for the modified alumina and 30% for the alumina. The flow rate of introduction of each of the suspensions into the channel 1 is 6 mL/h and the printing speed is 5.85 mm/s.

Depending on the amount and nature of the polyelectrolyte being used, a debinding phase during the heat treatment of the ceramic might be necessary in this system type.

In the five examples described hereinabove, the printing speed can be adjusted according to the flow rate of the suspensions and the dimension A1 of the outlet 27 of the channel 1.

The five examples of combinations of suspensions described hereinabove with reference to FIG. 2 apply by analogy to the embodiment of FIG. 1.

Of course, the parameters of the suspensions may be adapted to the structural features of their assembly which result from the geometry of the channel 1. For example, without limitation, in the context of the first example described hereinabove, the volume fraction of powder in each of the suspensions may be 50 v % when the device of FIG. 1 is used.

The invention is not limited to the particular examples and embodiments that are described hereinabove. For example, the channel(s) 1 and/or 21 and/or 22 may have a geometry and dimensions different from those indicated hereinabove. The dimension A1 may be smaller than 800 μm, for example equal to about 400 μm in order to increase the definition of the part or, on the contrary, be larger than 800 μm. The dimension A2 may be adjusted according to the suspensions and the time required for aggregation/agglomeration of the particles that they contain.

Other combinations of suspensions and/or an amount of suspensions greater than two may be implemented, depending on the desired particular arrangements and the structure of the composition.

The introduction of the suspensions into the channel 1 and expulsion thereof may be carried out discontinuously.

As another example, the composition coming out of the channel 1 may be subjected to a concomitant drying step, for example according to the outlet dimension A1 of the channel 1 and/or the expulsion flow rate.

Furthermore, the above-described principles may be implemented not to make a part by additive manufacturing but to carry out an operation of gluing, assembling, repairing or encapsulating an object.

The invention claimed is:

1. A method for preparing and depositing a composition, comprising:

a step of introducing two suspensions each comprising particles into a channel, these suspensions penetrate the channel by flowing towards an outlet according to a flow direction, a step of assembling the suspensions within the channel so as to form, upstream of the outlet with respect to the flow direction, said composition and so that this composition includes aggregates or agglomerates of said particles, a step of expelling the composition from the channel, the movement of the suspension along the channel in the flow direction results in a progressive expulsion of the composition through the outlet.

2. The method according to claim 1, wherein the particles comprise a first type of particles and a second type of particles selected so as to be able to develop bonds, therebetween during the assembly step, in order to form said aggregates or agglomerates.

3. The method according to claim 2, wherein, during the introduction step, one of the suspensions comprises the particles of the first type and the other one of said suspensions comprises the particles of the second type.

4. The method according to claim 2, wherein the particles of the first type and the particles of the second type have surface electrical charges of opposite signs.

5. The method according to claim 4, wherein the surface electrical charges of opposite signs are a zeta potential of opposite signs.

6. The method according to claim 2, wherein, the bonds are electrostatic bonds.

7. The method according to claim 1, wherein said suspensions are colloidal suspensions.

8. The method according to claim 1, wherein the particles are selected so that the composition expelled from the channel forms an element made of ceramic.

9. The method according to claim 1, wherein the expulsion step is carried out so as to manufacture a part by depositing one or more layer(s) of said composition.

* * * * *